United States Patent
Fitzer et al.

(10) Patent No.: US 10,956,140 B2
(45) Date of Patent: Mar. 23, 2021

(54) SOFTWARE INSTALLATION THROUGH AN OVERLAY FILE SYSTEM

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/376,305

(22) Filed: Apr. 5, 2019

(65) Prior Publication Data

US 2020/0319869 A1 Oct. 8, 2020

(51) Int. Cl.
G06F 9/445 (2018.01)
G06F 8/61 (2018.01)

(52) U.S. Cl.
CPC .................................. *G06F 8/61* (2013.01)

(58) Field of Classification Search
CPC .................................................. G06F 8/61
USPC ........................................ 717/168, 120–122
See application file for complete search history.

(56) References Cited

U.S. PATENT DOCUMENTS

| | | | |
|---|---|---|---|
| 6,356,915 B1 | 3/2002 | Chtchetkine et al. | |
| 7,636,722 B2 | 12/2009 | Bunker et al. | |
| 7,769,794 B2 | 8/2010 | Moore et al. | |
| 10,169,347 B2 | 1/2019 | Jayachandran et al. | |
| 2004/0189707 A1 | 9/2004 | Moore et al. | |
| 2004/0193594 A1 | 9/2004 | Moore et al. | |
| 2004/0193621 A1 | 9/2004 | Moore et al. | |
| 2004/0193672 A1 | 9/2004 | Samji et al. | |
| 2004/0193673 A1 | 9/2004 | Samji et al. | |
| 2004/0230599 A1 | 11/2004 | Moore et al. | |
| 2005/0246331 A1 | 11/2005 | De Vorchik et al. | |
| 2006/0036568 A1 | 2/2006 | Moore et al. | |
| 2007/0067349 A1 | 3/2007 | Jhaveri et al. | |
| 2007/0245257 A1 | 10/2007 | Chan et al. | |
| 2009/0157627 A1 | 6/2009 | Arthursson | |
| 2011/0119634 A1 | 5/2011 | Bhatt et al. | |

(Continued)

OTHER PUBLICATIONS

"U.S. Appl. No. 16/376,408, Non Final Office Action dated Apr. 29, 2020", 12 pgs.

(Continued)

*Primary Examiner* — Chuck O Kendall
(74) *Attorney, Agent, or Firm* — Schwegman Lundberg & Woessner, P.A.

(57) ABSTRACT

A user requests installation of a software package on a server. The server identifies an artifact for the software package installed on a first layer of an overlay file system. Based on dependency information for the artifact, the server identifies one or more additional artifacts that the artifact depends on, installed on additional layers of the overlay file system. Instead of duplicating the software package and its dependencies in storage for the user, the server updates a layer strategy for the user. A layer strategy indicates a set of layers to be used by an overlay file system in generating a logical file system. The updated layer strategy for the user includes both the layer for the artifact of the requested software package and the layers for the additional artifacts that the software package depends on.

20 Claims, 10 Drawing Sheets

(56) References Cited

U.S. PATENT DOCUMENTS

| | | | |
|---|---|---|---|
| 2012/0198559 A1* | 8/2012 | Venkata Naga Ravi | ........... G06F 21/62 726/26 |
| 2014/0248002 A1 | 9/2014 | Thakkar et al. | |
| 2015/0128105 A1 | 5/2015 | Sethi et al. | |
| 2015/0261774 A1 | 9/2015 | Mcferrin et al. | |
| 2015/0261782 A1 | 9/2015 | Mcferrin et al. | |
| 2015/0261971 A1 | 9/2015 | Mcferrin et al. | |
| 2015/0268948 A1 | 9/2015 | Plate | |
| 2016/0378348 A1 | 12/2016 | Uriel | |
| 2016/0378676 A1 | 12/2016 | Uriel | |
| 2017/0048079 A1 | 2/2017 | Nethi et al. | |
| 2017/0075675 A1 | 3/2017 | Babol et al. | |
| 2017/0206071 A1 | 7/2017 | Kirkpatrick | |
| 2017/0344292 A1 | 11/2017 | Sterin et al. | |
| 2017/0364342 A1 | 12/2017 | Shuster et al. | |
| 2018/0027006 A1 | 1/2018 | Zimmermann et al. | |
| 2018/0027070 A1 | 1/2018 | Jhanji et al. | |
| 2018/0129479 A1 | 5/2018 | Mcpherson et al. | |
| 2018/0129803 A1 | 5/2018 | Levin et al. | |
| 2018/0196654 A1 | 7/2018 | Bo et al. | |
| 2018/0211029 A1 | 7/2018 | Ryu et al. | |
| 2018/0293066 A1 | 10/2018 | Ali et al. | |
| 2018/0295059 A1 | 10/2018 | Gamage | |
| 2018/0341471 A1 | 11/2018 | Stefanov et al. | |
| 2018/0356964 A1 | 12/2018 | Morris | |
| 2018/0357068 A1 | 12/2018 | Ambichl et al. | |
| 2019/0004779 A1 | 1/2019 | Schmidt et al. | |
| 2019/0026474 A1 | 1/2019 | Adam et al. | |
| 2019/0042286 A1 | 2/2019 | Bailey et al. | |
| 2019/0095179 A1 | 3/2019 | Straub | |
| 2019/0173949 A1 | 6/2019 | Inomata et al. | |
| 2019/0227794 A1 | 7/2019 | Mercille et al. | |
| 2019/0235900 A1 | 8/2019 | Singh et al. | |
| 2019/0272224 A1 | 9/2019 | Woods | |
| 2019/0324786 A1 | 10/2019 | Ranjan et al. | |
| 2019/0349402 A1 | 11/2019 | Shukla et al. | |
| 2020/0019410 A1 | 1/2020 | Dima et al. | |
| 2020/0034745 A1 | 1/2020 | Nagpal et al. | |

OTHER PUBLICATIONS

"U.S. Appl. No. 16/376,453, Non Final Office Action dated Apr. 30, 2020", 16 pgs.

Brown, Nigel, "The Overlay File System", [Online]. Retrieved from the Internet: <URL: https://windsock.io/the-overlay-filesystem/>, (May 22, 2015), 5 pgs.

U.S. Appl. No. 16/376,277, filed Apr. 5, 2019, Multitenancy Using an Overlay File System.

U.S. Appl. No. 16/376,408, filed Apr. 5, 2019, Declarative Multi-Artefact Software Installation.

U.S. Appl. No. 16/376,453, filed Apr. 5, 2019, Format for Multi-Artefact Software Packages.

U.S. Appl. No. 16/376,351, filed Apr. 5, 2019, Multitenant Application Server Using a Union File System.

"U.S. Appl. No. 16/376,408, Notice of Allowance dated Aug. 3, 2020".

"U.S. Appl. No. 16/376,453, Final Office Action dated Aug. 31, 2020", 19 pgs.

Heiner, Andreas P., et al., "Secure Software Installation in a Mobile Environment", (Jul. 18-20, 2007), pp. 155-156.

* cited by examiner

USER TABLE (310)

| USER ID | TENANT ID | PERMISSIONS |
|---|---|---|
| 1 | 1 | USER READ-ONLY, TENANT READ-ONLY |
| 2 | 1 | USER ALL, TENANT READ-ONLY |
| 3 | 1 | USER ALL, TENANT ALL |
| 4 | 2 | USER ALL, TENANT READ-ONLY |

STRATEGY TABLE (340)

| STRATEGY ID | LAYER ID | LAYER ORDER |
|---|---|---|
| 1 | 1 | 1 |
| 1 | 2 | 2 |
| 2 | 2 | 1 |
| 2 | 3 | 2 |

TENANT TABLE (370)

| TENANT ID | STRATEGY ID |
|---|---|
| 1 | 1 |
| 2 | 2 |
| 3 | 3 |
| 4 | 4 |

FIG. 3

Dependency Table (410) — 300

| LAYER ID (420) | DEPENDENCY LIST |
|---|---|
| 1 (430A) | 2 |
| 2 (430B) | NULL |
| 3 (430C) | NULL |

Application Table (440)

| LAYER ID (450) | APPLICATION NAME |
|---|---|
| 1 (460A) | WORD PROCESSOR |
| 2 (460B) | TEXT EDITOR |
| 3 (460C) | SPREADSHEET |

SOFTWARE INSTALLATION THROUGH AN OVERLAY FILE SYSTEM

TECHNICAL FIELD

The subject matter disclosed herein generally relates to overlay file systems. Specifically, the present disclosure addresses systems and methods to install software through an overlay file system.

BACKGROUND

An overlay file system provides a logical file system that merges two or more physical file systems. Any files that are present in exactly one of the merged file systems are presented unchanged in the resulting logical file system. For files that are present in more than one of the merged file systems, one of the files is selected by the overlay file system to be presented in the logical file system.

An artifact is a file, such as a Java archive (JAR) file, that includes one or more files for an application. The files within the artifact may be source files, executable files, and description files. A software package comprises one or more artifacts. The source files and executable files of the artifacts are used to execute the software package itself. A description file includes information about the artifact, including dependencies of the artifact. A first artifact is dependent on a second artifact if the first artifact requires the second artifact in order to be used.

BRIEF DESCRIPTION OF THE DRAWINGS

Some embodiments are illustrated by way of example and not limitation in the figures of the accompanying drawings.

DETAILED DESCRIPTION

Example methods and systems are directed to software installation through an overlay file system. A user requests installation of a software package on a server. The server identifies one or more artifacts for the software package installed on a first layer of the overlay file system. Based on dependency information for the artifacts of the software package, the server identifies one or more additional artifacts that the software package depends on, installed on additional layers of the overlay file system. Instead of duplicating the software package and its dependencies in storage for the user, the server updates a layer strategy for the user. A layer strategy indicates a set of layers to be used by an overlay file system in generating a logical file system. The updated layer strategy for the user includes both the layer of the artifacts for the requested software package and the layers for the additional artifacts that the software package depends on.

By comparison with existing methods of software installation, the methods and systems discussed herein improve efficiency by installing each artifact only once. Updating the layer strategy is a faster operation than installing a software package. Accordingly, the performance of the application server is improved. Furthermore, processor cycles involved in reinstallation are saved, as are storage resources.

Figure 1:
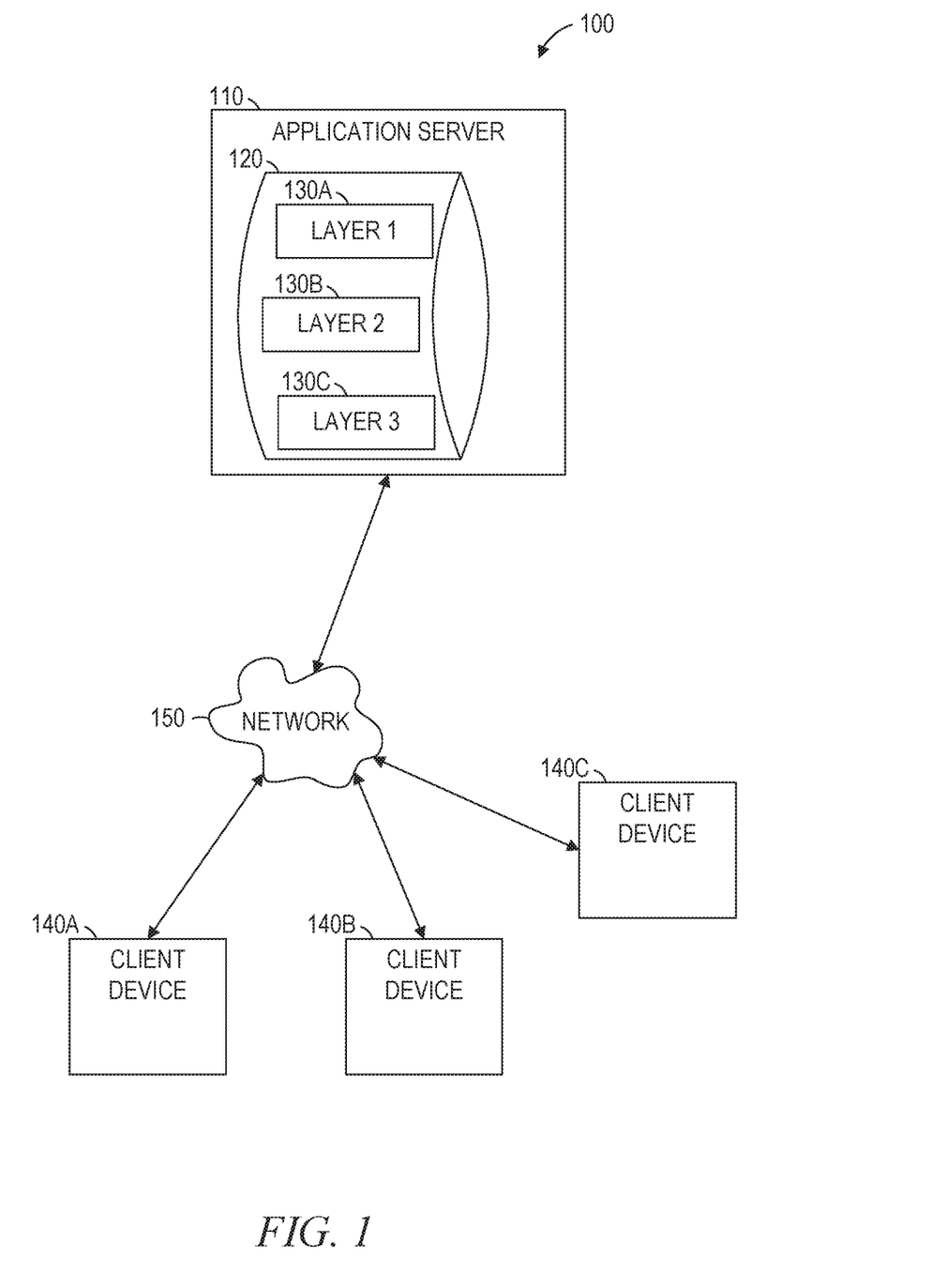
FIG. 1 is a network diagram illustrating a network environment suitable for software installation through an overlay file system, according to some example embodiments.

FIG. 1 is a network diagram illustrating a network environment 100 suitable for software installation through an overlay file system, according to some example embodiments. The network environment 100 includes an application server 110, client devices 140A, 140B, and 140C, and a network 150. The application server 110 accesses layers 130A, 130B, and 130C of an overlay file system stored on a storage device 120 (e.g., a hard drive, solid state disk drive, or other data storage device) to provide data access to logical file systems to the client devices 140A-140C. The application server 110 and the client devices 140A, 140B, and 140C may each be implemented in a computer system, in whole or in part, as described below with respect to FIG. 10. The client devices 140A, 140B, and 140C may be referred to collectively as client devices 140 or generically as a client device 140.

The client device 140 may provide identifying information to the application server 110, and the identifying information may be used by the application server 110 to determine how to interpret which of the layers 130A-130C to combine in providing a logical file system to the client device 140.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL, database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110 and the client devices 140A-140C are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
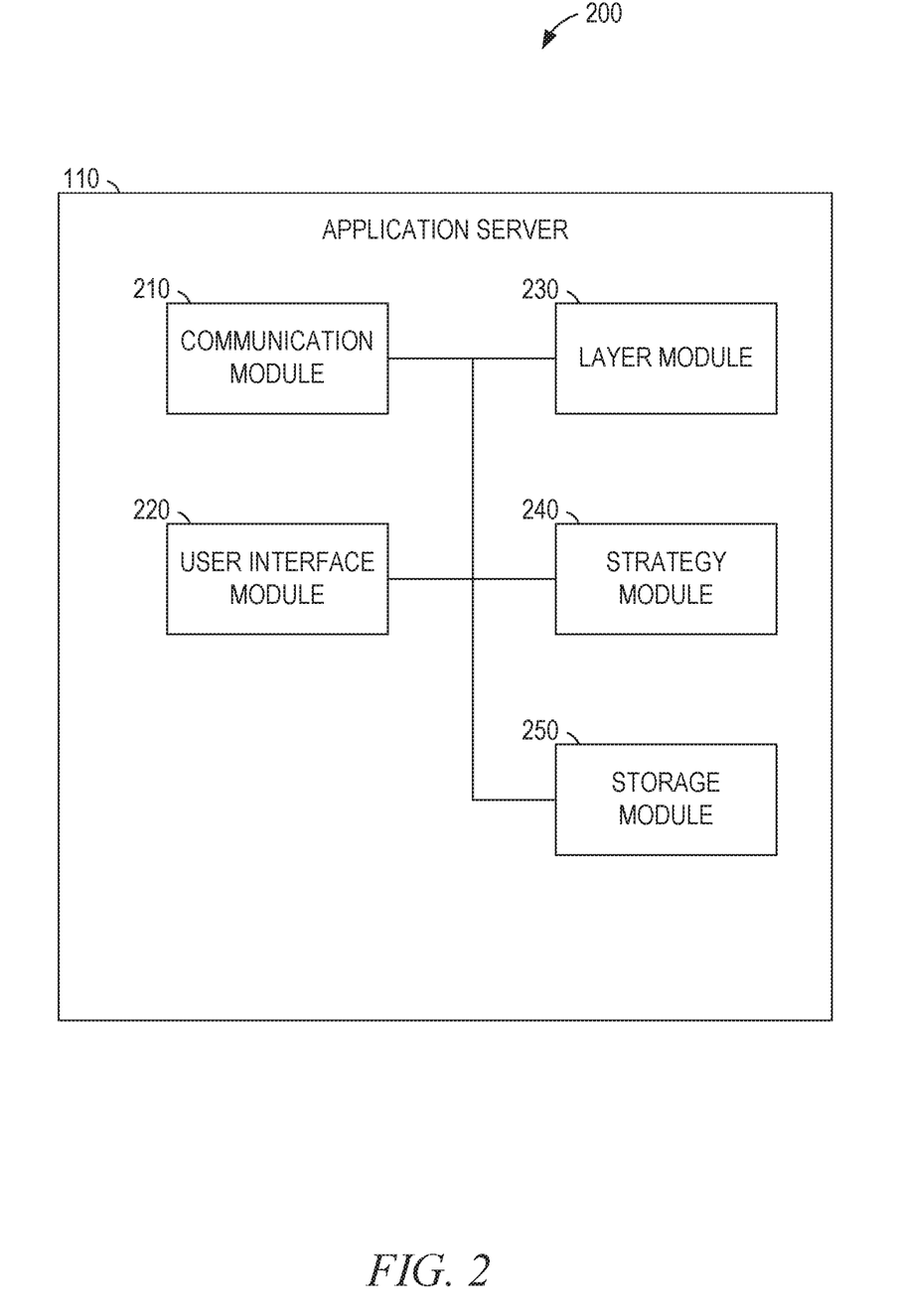
FIG. 2 is a block diagram of an application server, according to some example embodiments, suitable for software installation through an overlay file system.

FIG. 2 is a block diagram 200 of the application server 110, according to some example embodiments, suitable for software installation through an overlay file system. The application server 110 is shown as including a communication module 210, a user interface module 220, a layer module 230, a strategy module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 110 and transmits data from the application server 110. For example, the communication module 210 may receive, from the client device 140A, a request for access to an application stored on a layer of an overlay file system. The communication module 210 provides the request to the strategy module 240. The strategy module 240, in conjunction with the layer module 230, updates a strategy for the client device 140A to include the layer of the application and any layers containing dependencies of the application. Communications sent and received by the communication module 210 may be intermediated by the network 150.

The user interface module 220 causes presentation of a user interface for the application server 110 on a display associated with the client device 140A, 140B, or 140C. The user interface allows a user to select an application from a list of applications, to interact with an application, or any suitable combination thereof.

The storage module 250 interfaces with the storage device 120 to store data and access stored data. The strategy module 240 identifies a set of layers for a logical file system and, using the storage module 250, generates the logical file system for a strategy, for provision to a user.

Figure 3:
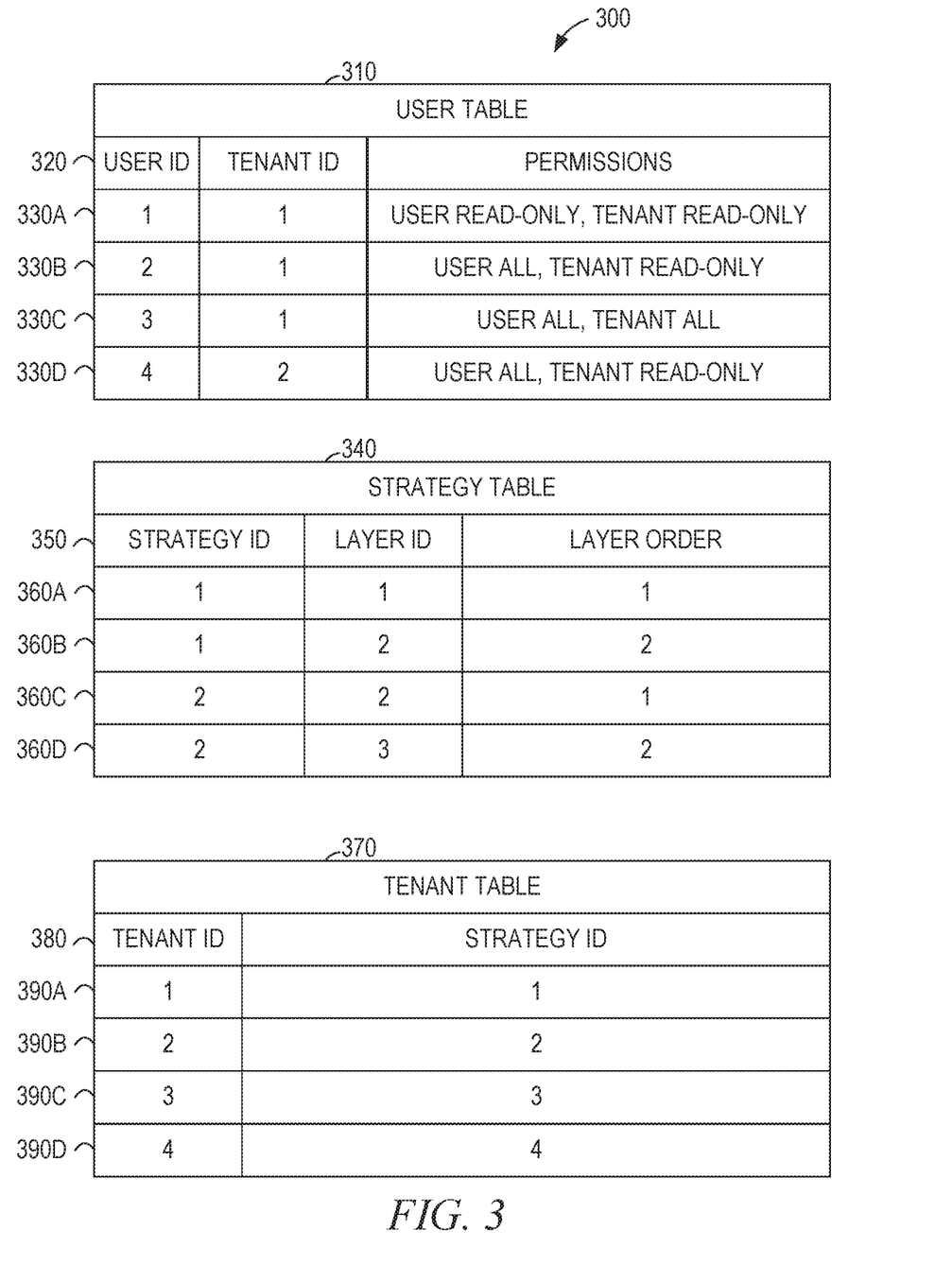
FIGS. 3-4 are a block diagram of a database schema suitable for use in implementing software installation through an overlay file system, according to some example embodiments.
Figure 4:
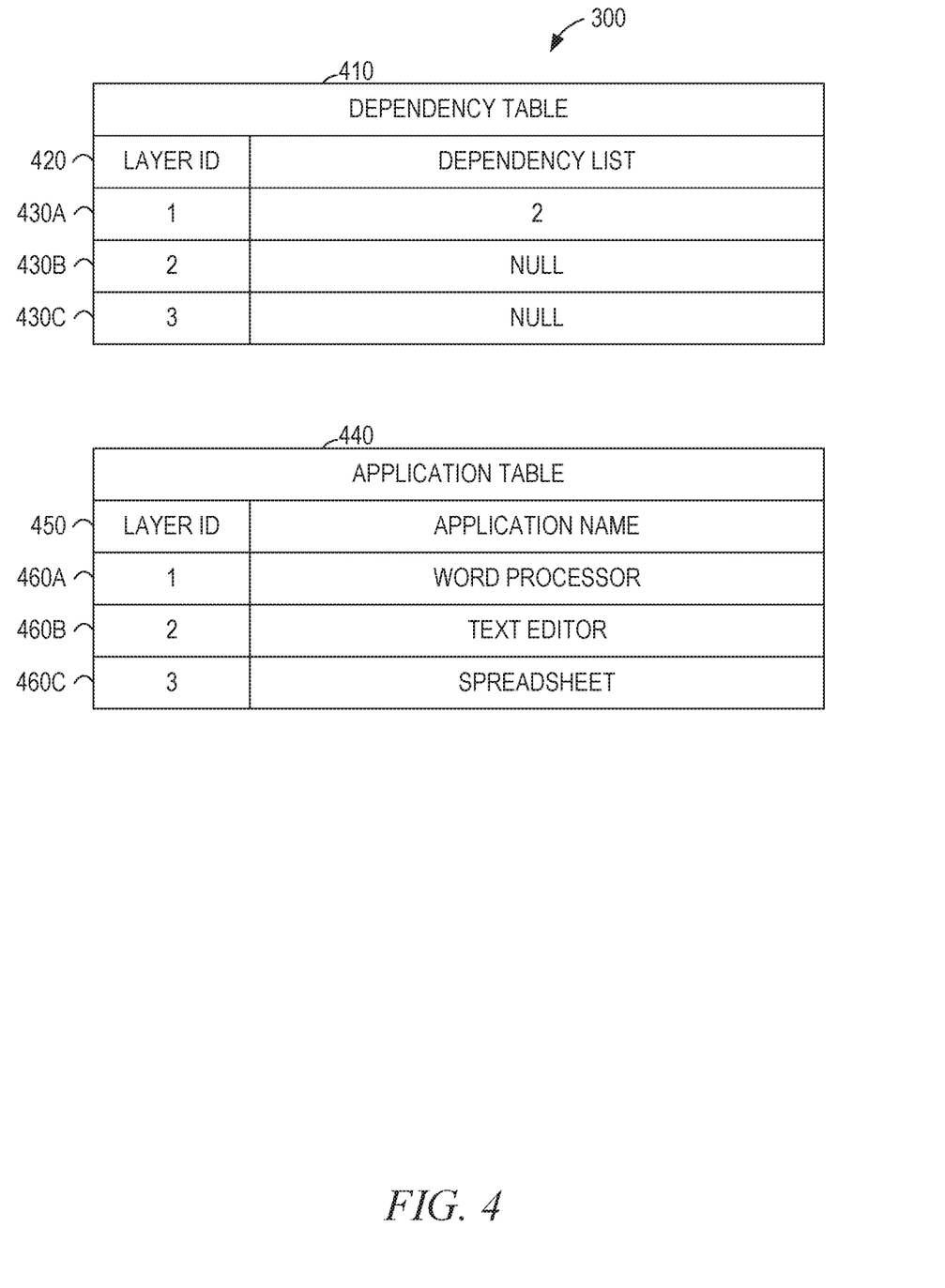

FIGS. 3-4 are a block diagram of a database schema 300 suitable for use in implementing software installation through an overlay file system, according to some example embodiments. The database schema 300 includes a user table 310, a strategy table 340, a tenant table 370, a dependency table 410, and an application table 440. The user table 310 includes rows 330A, 330B, 330C, and 330D of a format 320. The strategy table 340 includes rows 360A, 360B, 360C, and 360D of a format 350. The tenant table 370 includes rows 390A, 390B, 390C, and 390D of a format 380. The dependency table 410 includes rows 430A, 430B, and 430C of a format 420. The application table 440 includes rows 460A, 460B, and 460C of a format 450.

Each of the rows 330A-330D of the user table 310 includes a user identifier, a tenant identifier, and permissions. The user identifier is a unique identifier of the user. The tenant identifier identifies the tenant of the user (e.g., the business entity that is a customer of the business providing the application server 110). The permissions indicate whether the user has read-only access or all rights to their own files and to tenant-level files. Using the overlay file system, each user will see a file system comprising files from layers of the strategy of the tenant plus user-specific files.

The layers used in the strategies are identified in the rows 360A-360D of the strategy table 340. Each row 360A-360D includes a strategy identifier, a layer identifier, and a layer order. The rows 360A and 360B together indicate that, for strategy 1, layer 1 is the top layer and layer 2 is a lower layer. The rows 360C and 360D together indicate that, for strategy 2, layer 2 is the top layer and layer 3 is a lower layer.

The relationships between the strategies defined in the strategy table 340 and the tenants are defined in the tenant table 370. Each of the rows 390A-390D relates a tenant identifier to a strategy identifier. Thus, when a user connects to the application server 110 using a user identifier, cross-referencing of the tenant identifier in the user table 310 with the tenant identifier in the tenant table 370 identifies the strategy for the user, and reference to the strategy table 340 enables the overlay file system to determine the strategy to be used in providing the logical file system to the user.

Each row 430A-430C of the dependency table 410 includes a layer identifier and a dependency list. The dependency list indicates which layers the identified layer is dependent on. Thus, the row 430A indicates that the application on layer 1 is dependent on the application on layer 2. Thus, if a user installs the application on layer 1, adding layer 1 to their strategy, the application server 110 is enabled to automatically add layer 2 to the strategy as well. In this way, applications are (logically) installed with their dependencies, and are able to function without the user being required to install the dependencies manually.

The application table 440 provides a text string name for each application and identifies the layer corresponding to the application. Thus, a user interface may display a list of human-readable application names, and the application server 110 is enabled to identify the layer of a selected application to support software installation through an overlay file system.

Figure 5:
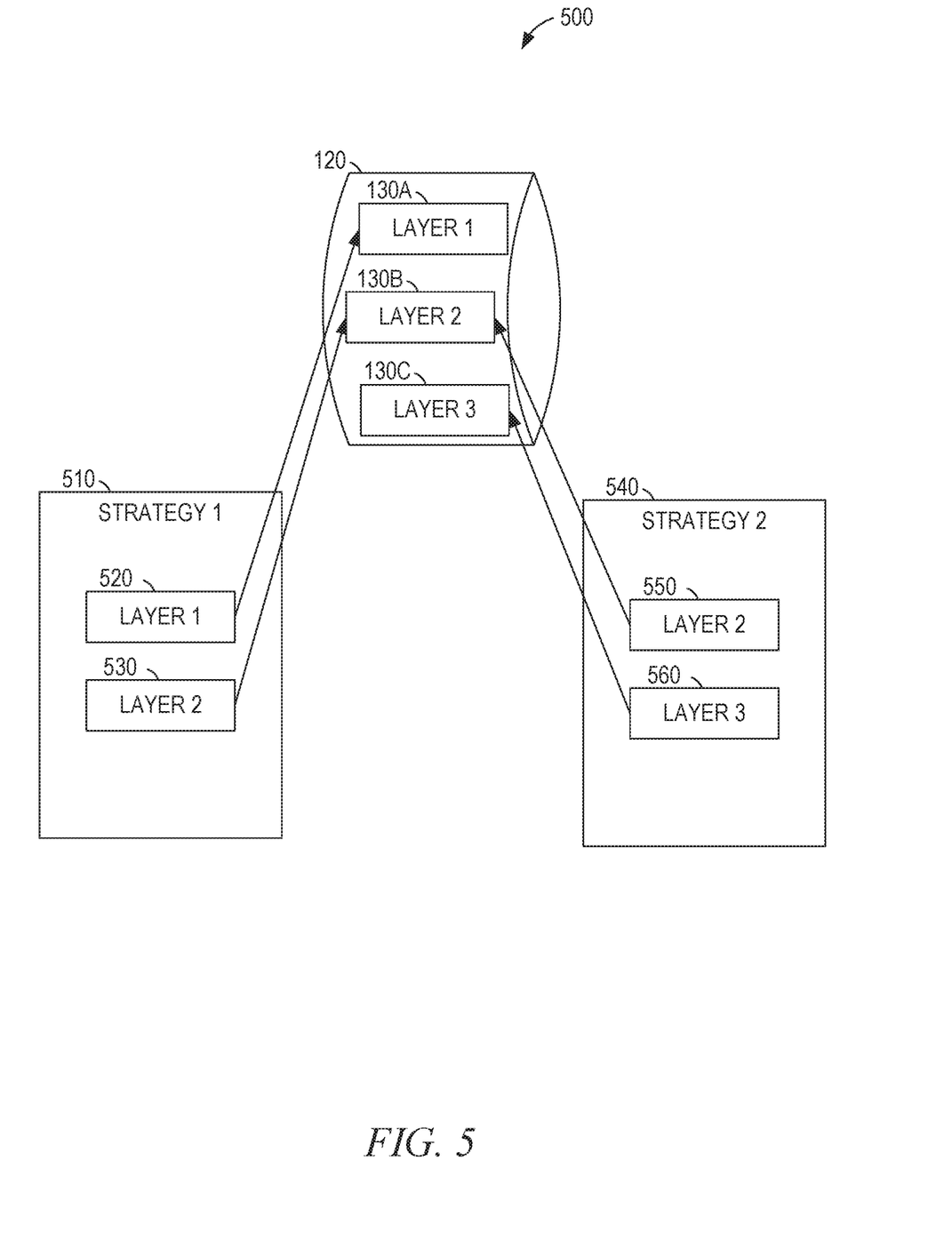
FIG. 5 is an illustration of an overlay file system with two strategies for accessing layers in implementing software installation through an overlay file system, according to some example embodiments.

FIG. 5 is an illustration 500 of an overlay file system with two strategies 510 and 540 for accessing layers in implementing software installation through an overlay file system, according to some example embodiments. The storage device 120 contains the layers 130A-130C. The strategy 510 includes references 520 and 530 to the layers 130A and 130B. The overlay file system creates a logical file system using the strategy 510 to provide access to the files of the layers 130A and 130B without duplicating the stored data of the layers 130A and 130B. Similarly, the strategy 540 includes references 550 and 560 to the layers 130B and 130C. The overlay file system creates a logical file system using the strategy 540 to provide access to the files of the layers 130B and 130C without duplicating the stored data of the layers 130B and 130C.

In this simple illustrative example, the gain from providing an overlay file system instead of a standard file system amounts only to the saving of a single duplication of the layer 130B. In a more complex system, any number of layers may be stored in the storage device 120, and any number of strategies, representing any number of combinations of layers, may be used. Regardless of the number of strategies and the number of different logical file systems created from the different combinations of layers, each layer is only physically stored once in the storage device 120.

Figure 6:
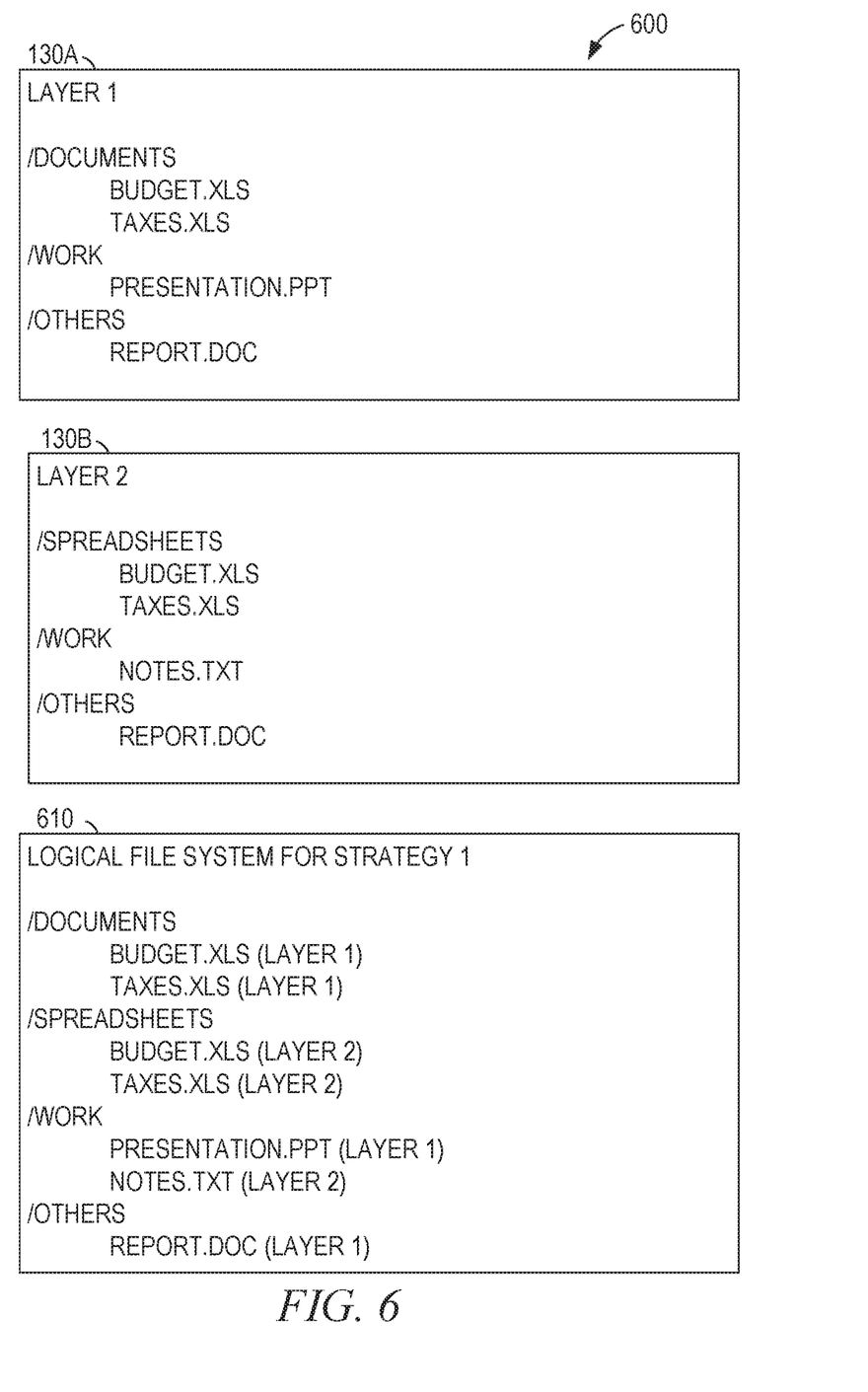
FIG. 6 is an illustration with additional details of a strategy of FIG. 5, according to some example embodiments.

FIG. 6 is an illustration 600 showing a logical file system 610 for the strategy 510 of FIG. 5, according to some example embodiments. Details of the layer 130A are shown, including four files stored in three directories. Details of the layer 130B are also shown, also including four files stored in three directories, with only the/others/report.doc file being the same in both layers. The logical file system 610 includes the six distinct files from the two layers and the report.doc file from the layer 130A. As shown in FIG. 5, the layer 130A is a higher layer than the layer 130B. The overlay file system resolves conflicts in favor of the higher layer. Accordingly, the report.doc file from the layer 130A is made available to users of the strategy 510, and the report.doc file from the layer 130B is hidden.

Figure 7:
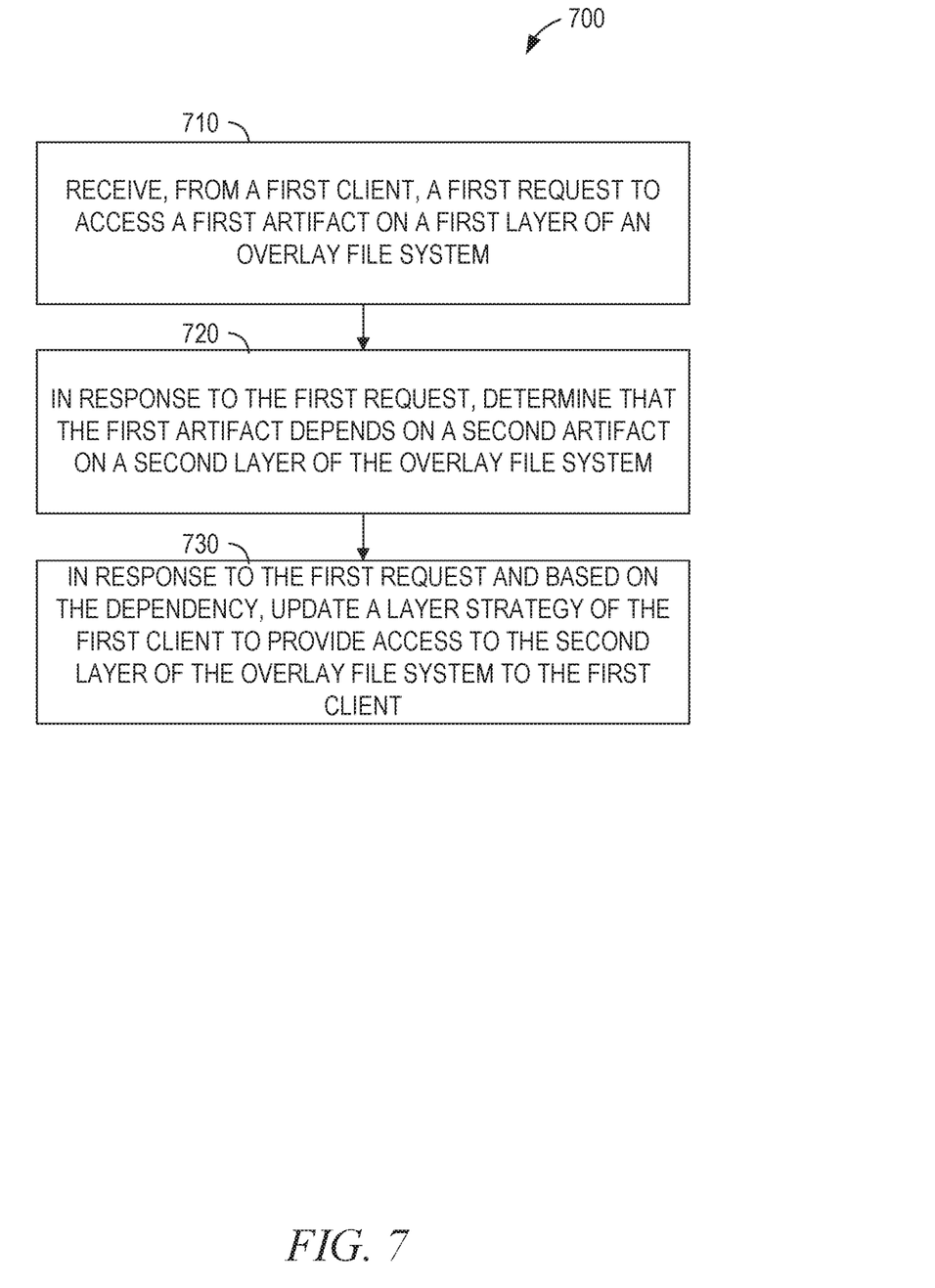
FIG. 7 is a flowchart illustrating operations of a method suitable for software installation through an overlay file system, according to some example embodiments.

FIG. 7 is a flowchart illustrating operations of a method 700 suitable for software installation through an overlay file system, according to some example embodiments. The method 700 includes operations 710, 720, and 730. By way of example and not limitation, the method 700 is described as being performed by the devices, modules, and databases of FIGS. 1-6.

In operation 710, the layer module 230 receives, from a first client, a first request to access a first artifact on a first layer of an overlay file system. For example, the user interface module 220 causes the first client to display a user interface with a list of available applications, each application being stored on a corresponding layer. Via the user interface, a user selects an application and causes the first request to be sent to the application server 110.

In operation 720, in response to the first request, the layer module 230 determines that the first artifact depends on a second artifact on a second layer of the overlay file system. For example, the application table 440 is used to identify a layer from an application name, and the dependency table 410 is used to identify the dependencies of a layer. Thus, if the word processor application is requested in operation 710, then layer 2, corresponding to the text editor application, is found to be a dependency of the requested application in operation 720.

The strategy module 240, in response to the first request and based on the dependency, updates a layer strategy of the first client to provide access to the second layer of the overlay file system to the first client (operation 730). For example, the strategy table 340 is updated to add rows for the layer of the application (the first layer) and its dependencies (including the second layer) to the strategy for the tenant corresponding to a user identifier associated with the first client (e.g., based on a user login on the first client prior to making the first request).

Thus, by use of the method 700, a request for access to an application on a first layer results in being given access to another application on a second layer. In this way, a user gains access to an application and any application it depends on without physically duplicating the data for the application or its dependencies, reducing storage space usage and processor usage.

Figure 8:
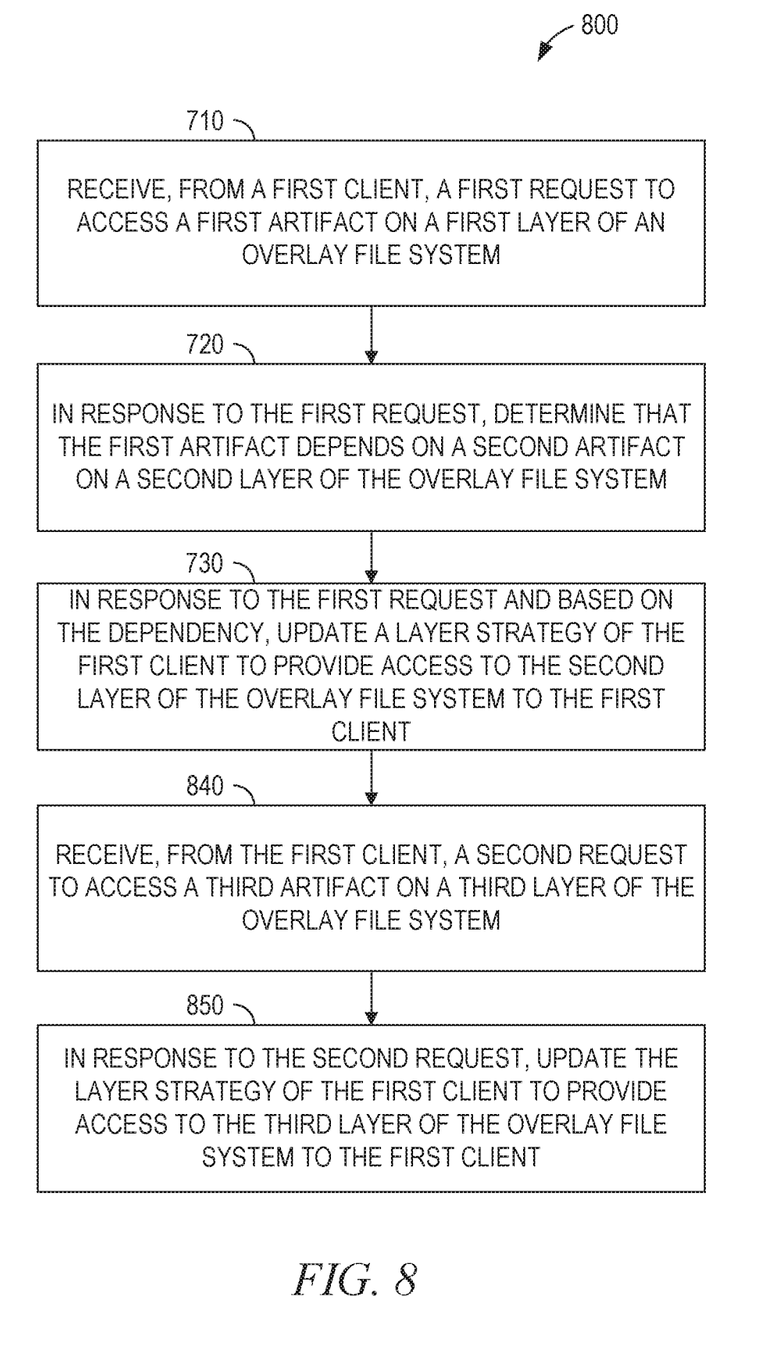
FIG. 8 is a flowchart illustrating operations of a method suitable for software installation through an overlay file system, according to some example embodiments.

FIG. 8 is a flowchart illustrating operations of a method 800 suitable for software installation through an overlay file system, according to some example embodiments. The method 800 includes operations 710, 720, 730, 840, and 850. By way of example and not limitation, the method 800 is described as being performed by the devices, modules, and databases of FIGS. 1-6. Operations 710-730 are described above, with respect to FIG. 7.

In operation 840, the layer module 230 receives, from the first client, a second request to access a third artifact on a third layer of the overlay file system. For example, the user interface module 220 causes the first client to display a user interface with a list of available applications, each application being stored on a corresponding layer. Via the user interface, a user selects an application and causes the second request to be sent to the application server 110.

The strategy module 240, in response to the second request, updates the layer strategy of the first client to provide access to the third layer of the overlay file system to the first client (operation 850). For example, the strategy table 340 is updated to add rows for the layer of the application (the third layer) to the strategy for the tenant corresponding to a user identifier associated with the first client (e.g., based on a user login on the first client prior to making the second request).

As part of the operation of adding the third layer to the strategy of the first client, the dependencies of the third artifact are checked by the layer module 230. If the third artifact is dependent on any artifacts not already part of the strategy, the layers for those artifacts are added to the strategy, as in operations 720 and 730. If the third artifact is dependent on any artifacts that are already part of the strategy, the third layer is added to the strategy above the layers of its dependencies.

Though the method 800 is described as including receiving a request for an artifact with a dependency before receiving a request for another artifact, it should be understood that the first request and the second request may be received in any order. Furthermore, additional requests may be handled by the layer module 230 and the strategy module 240, allowing for any number of layers to be added to the strategy for the first client. Additionally, the methods 700 and 800 may be repeated for additional clients, of the same tenant or one or more additional tenants.

Figure 9:
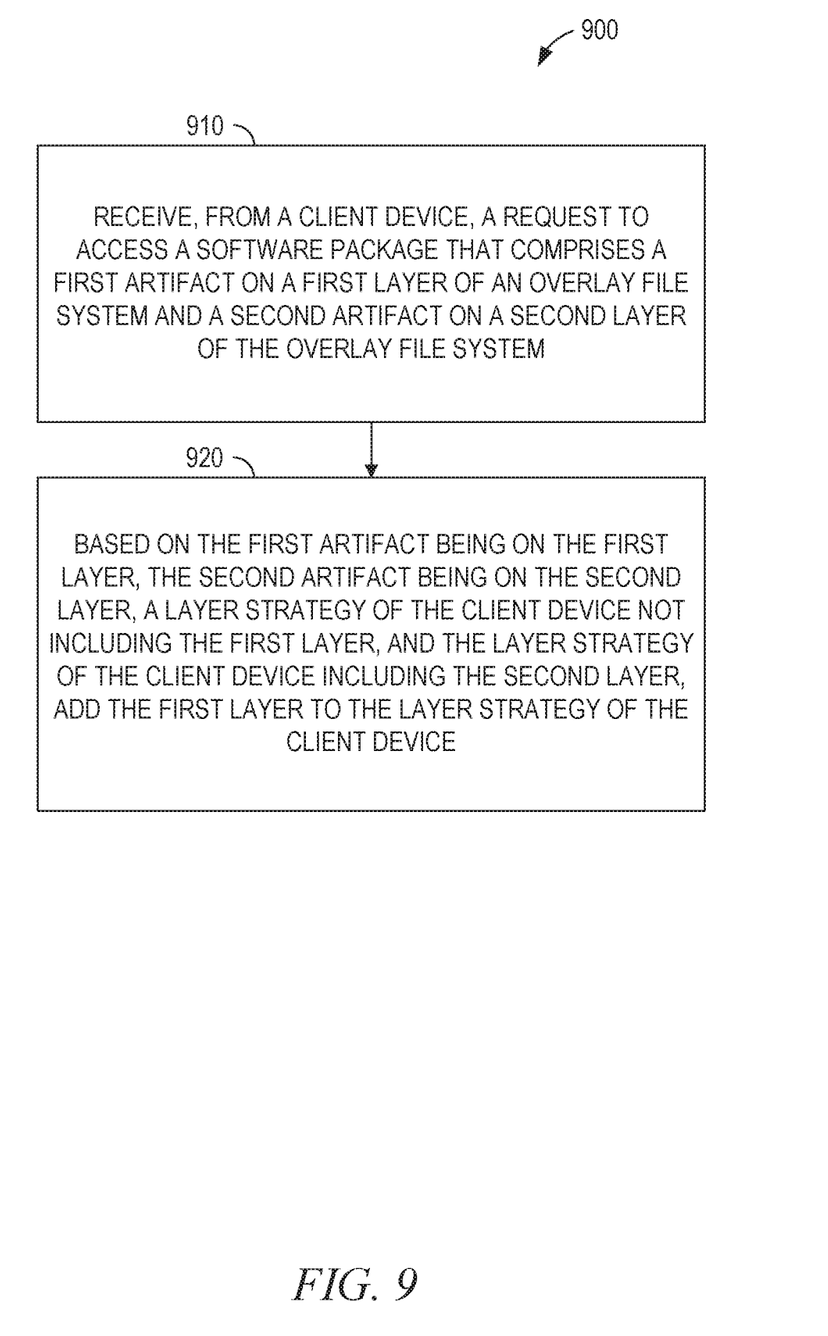
FIG. 9 is a flowchart illustrating operations of a method suitable for software installation through an overlay file system, according to some example embodiments.

FIG. 9 is a flowchart illustrating operations of a method 900 suitable for software installation through an overlay file system, according to some example embodiments. The method 900 includes operations 910 and 920. By way of example and not limitation, the method 900 is described as being performed by the devices, modules, and databases of FIGS. 1-6.

In operation 910, the layer module 230 of the application server 110 receives, from a client device (e.g., the client device 140A), a request to access a software package that comprises a first artifact on a first layer of an overlay file system and a second artifact on a second layer of the overlay file system. For example, while the application table 440 shows a single layer identifier associated with each application, in some example embodiments, multiple layer identifiers are associated with a software package, indicating the layers storing artifacts comprising the software package.

In operation 920, based on the first artifact being on the first layer, the second artifact being on the second layer, a layer strategy of the client device not including the first layer, and the layer strategy of the client device including the second layer, the layer module 230 adds the first layer to the layer strategy of the client device. Thus, after operation 920 is complete, the layers for the requested software application are added to the layer strategy of the client device without duplicating any layers.

EXAMPLES

Example 1

A method comprising:
receiving, from a first client via a network, a first request to access a first artifact on a first layer of an overlay file system; and
in response to the first request:

determining that the first artifact depends on a second artifact on a second layer of the overlay file system; and
updating, by one or more hardware processors, a layer strategy of the first client to provide access to the first layer and the second layer of the overlay file system to the first client, the first layer being above the second layer.

Example 2

The method of example 1, further comprising:
receiving, from the first client, a second request to access a third artifact on a third layer of the overlay file system; and
in response to the second request, updating the layer strategy of the first client to provide access to the third layer of the overlay file system to the first client.

Example 3

The method of example 2, wherein:
the third artifact indicates a dependency on the first artifact; and
the updating of the layer strategy of the first client to provide access to the third layer of the overlay file system to the first client comprises, based on the dependency, providing the third layer as a higher layer than the first layer.

Example 4

The method of any of examples 1 to 3, wherein the first artifact comprises a first plurality of files and the second artifact comprises a second plurality of files.

Example 5

The method of any of examples 1 to 4, wherein the first client has read-only access to the first layer.

Example 6

The method of any of examples 1 to 5, wherein:
the first client is of a first tenant comprising the first client and a second client; and
the updating of the layer strategy of the first client comprises updating a layer strategy of the first tenant.

Example 7

The method of example 6, further comprising:
receiving, from a third client of a second tenant, a second request to access the first artifact on the first layer of the overlay file system; and
in response to the second request, updating a layer strategy of the third client to provide access to the first layer of the overlay file system to the third client.

Example 8

A system comprising:
a memory that stores instructions; and
one or more processors configured by the instructions to perform operations comprising:
receiving, from a first client via a network, a first request to access a first artifact on a first layer of an overlay file system; and
in response to the first request:
determining that the first artifact depends on a second artifact on a second layer of the overlay file system; and
updating a layer strategy of the first client to provide access to the first layer and the second layer of the overlay file system to the first client, the first layer being above the second layer.

Example 9

The system of example 8, wherein the operations further comprise:
receiving, from the first client, a second request to access a third artifact on a third layer of the overlay file system; and
in response to the second request, updating the layer strategy of the first client to provide access to the third layer of the overlay file system to the first client.

Example 10

The system of example 9, wherein:
the third artifact indicates a dependency on the first artifact; and
the updating of the layer strategy of the first client to provide access to the third layer of the overlay file system to the first client comprises, based on the dependency, providing the third layer as a higher layer than the first layer.

Example 11

The system of any of examples 8 to 10, wherein the first artifact comprises a first plurality of files and the second artifact comprises a second plurality of files.

Example 12

The system of any of examples 8 to 11, wherein the first client has read-only access to the first layer.

Example 13

The system of any of examples 8 to 12, wherein:
the first client is of a first tenant comprising the first client and a second client; and
the updating of the layer strategy of the first client comprises updating a layer strategy of the first tenant.

Example 14

The system of example 13, wherein the operations further comprise:
receiving, from a third client of a second tenant, a second request to access the first artifact on the first layer of the overlay file system; and
in response to the second request, updating a layer strategy of the third client to provide access to the first layer of the overlay file system to the third client.

Example 15

A non-transitory computer-readable medium that stores instructions that; when executed by one or more processors; cause the one or more processors to perform operations comprising:
receiving, from a first client via a network, a first request to access a first artifact on a first layer of an overlay file system; and
in response to the first request:
determining that the first artifact depends on a second artifact on a second layer of the overlay file system; and updating a layer strategy of the first client to provide access to the first layer and the second layer of the overlay file system to the first client, the first layer being above the second layer.

Example 16

The computer-readable medium of example 15, wherein the operations further comprise:
receiving, from the first client, a second request to access a third artifact on a third layer of the overlay file system; and
in response to the second request, updating the layer strategy of the first client to provide access to the third layer of the overlay file system to the first client.

Example 17

The computer-readable medium of example 16, wherein:
the third artifact indicates a dependency on the first artifact; and
the updating of the layer strategy of the first client to provide access to the third layer of the overlay file system to the first client comprises, based on the dependency, providing the third layer as a higher layer than the first layer.

Example 18

The computer-readable medium of any of examples 15 to 17, wherein the first artifact comprises a first plurality of files and the second artifact comprises a second plurality of files.

Example 19

The computer-readable medium of any of examples 15 to 18, wherein the first client has read-only access to the first layer.

Example 20

The computer-readable medium of any of examples 15 to 19, wherein:
the first client is of a first tenant comprising the client and a second client; and
the updating of the layer strategy of the first client comprises updating a layer strategy of the first tenant.

Figure 10:
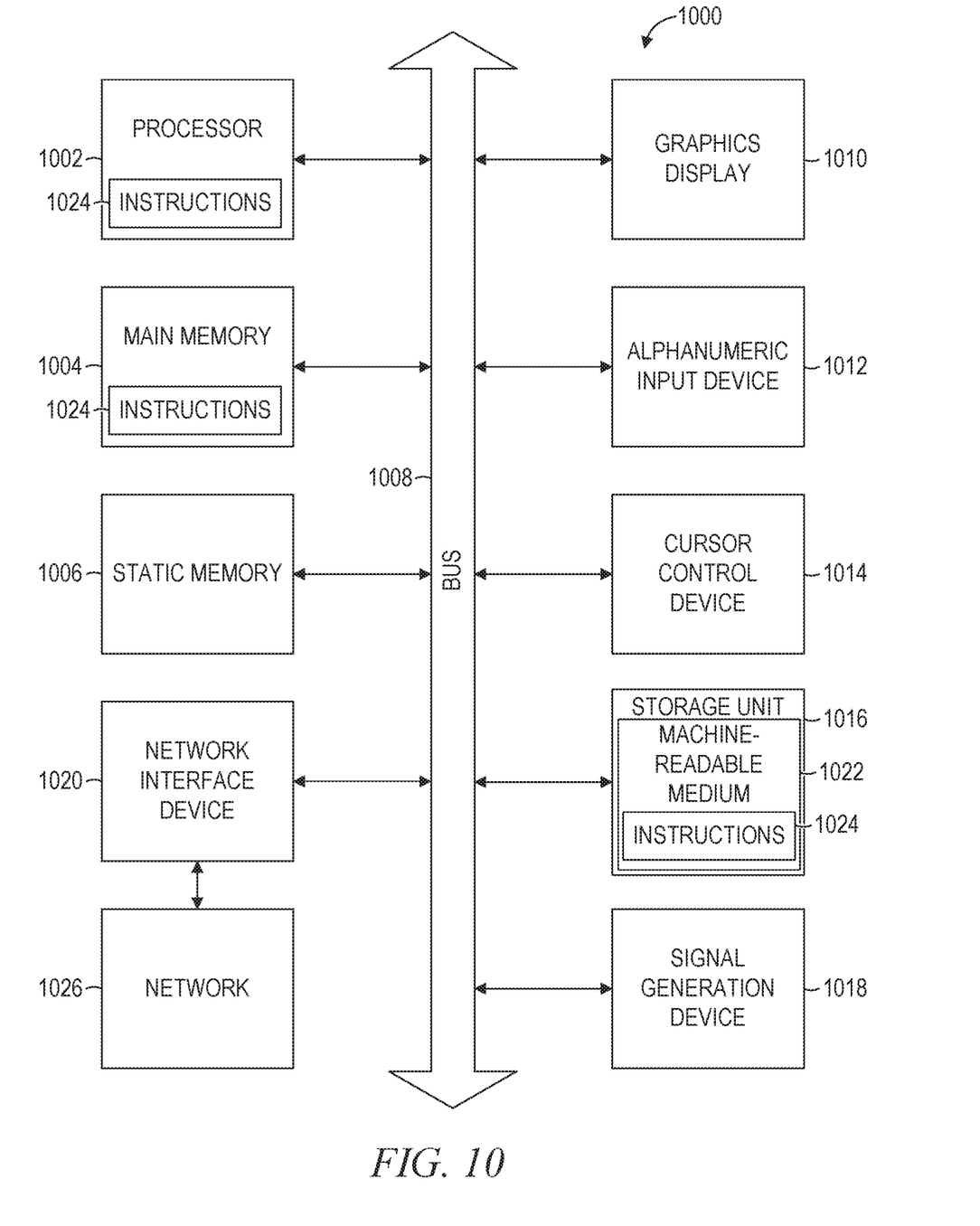
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system within which instructions 1024 (e.g., software, a program, an application, an apples, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (MC), or any suitable combination thereof), a main memory 1004, and a static memory 1006, which are configured to communicate with each other via a bus 1008. The machine 1000 may further include a graphics display 1010 (e.g., a plasma display panel (PDP), a light-emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or another pointing instrument), a storage unit 1016, a signal generation device 1018 (e.g., a speaker), and a network interface device 1020.

The storage unit 1016 includes a machine-readable medium 1022 on which are stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1000), such that the instructions, when executed by one or more processors of the machine (e.g., the processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data,"

"content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    receiving, from a first client via a network, a first request to access a first artifact on a first layer of an overlay file system; and
    in response to the first request:
        determining that the first artifact depends on a second artifact on a second layer of the overlay file system; and
        updating, by one or more hardware processors, a layer strategy of the first client to provide access to the first layer and the second layer of the overlay file system to the first client, the first layer being above the second layer.

2. The method of claim 1, further comprising:
    receiving, from the first client, a second request to access a third artifact on a third layer of the overlay file system; and
    in response to the second request, updating the layer strategy of the first client to provide access to the third layer of the overlay file system to the first client.

3. The method of claim 2, wherein:
    the third artifact indicates a dependency on the first artifact; and
    the updating of the layer strategy of the first client to provide access to the third layer of the overlay file system to the first client comprises, based on the dependency, providing the third layer as a higher layer than the first layer.

4. The method of claim 1, wherein the first artifact comprises a first plurality of files and the second artifact comprises a second plurality of files.

5. The method of claim 1, wherein the first client has read-only access to the first layer.

6. The method of claim 1, wherein:
    the first client is of a first tenant comprising the first client and a second client; and
    the updating of the layer strategy of the first client comprises updating a layer strategy of the first tenant.

7. The method of claim 6, further comprising:
    receiving, from a third client of a second tenant, a second request to access the first artifact on the first layer of the overlay file system; and
    in response to the second request, updating a layer strategy of the third client to provide access to the first layer of the overlay file system to the third client.

8. A system comprising:
    a memory that stores instructions; and
    one or more processors configured by the instructions to perform operations comprising:
        receiving, from a first client via a network, a first request to access a first artifact on a first layer of an overlay file system; and
        in response to the first request:
            determining that the first artifact depends on a second artifact on a second layer of the overlay file system; and
            updating a layer strategy of the first client to provide access to the first layer and the second layer of the overlay file system to the first client, the first layer being above the second layer.

9. The system of claim 8, wherein the operations further comprise:
    receiving, from the first client, a second request to access a third artifact on a third layer of the overlay file system; and
    in response to the second request, updating the layer strategy of the first client to provide access to the third layer of the overlay file system to the first client.

10. The system of claim 9, wherein:
    the third artifact indicates a dependency on the first artifact; and
    the updating of the layer strategy of the first client to provide access to the third layer of the overlay file system to the first client comprises, based on the dependency, providing the third layer as a higher layer than the first layer.

11. The system of claim 8, wherein the first artifact comprises a first plurality of files and the second artifact comprises a second plurality of files.

12. The system of claim 8, wherein the first client has read-only access to the first layer.

13. The system of claim 8, wherein:
    the first client is of a first tenant comprising the first client and a second client; and
    the updating of the layer strategy of the first client comprises updating a layer strategy of the first tenant.

14. The system of claim 13, wherein the operations further comprise:
    receiving, from a third client of a second tenant, a second request to access the first artifact on the first layer of the overlay file system; and
    in response to the second request, updating a layer strategy of the third client to provide access to the first layer of the overlay file system to the third client.

15. A non-transitory computer-readable medium that stores instructions that, when executed by one or more processors, cause the one or more processors to perform operations comprising:
    receiving, from a first client via a network, a first request to access a first artifact on a first layer of an overlay file system; and
    in response to the first request:
        determining that the first artifact depends on a second artifact on a second layer of the overlay file system; and
        updating a layer strategy of the first client to provide access to the first layer and the second layer of the overlay file system to the first client, the first layer being above the second layer.

16. The computer-readable medium of claim 15, wherein the operations further comprise:
    receiving, from the first client, a second request to access a third artifact on a third layer of the overlay file system; and in response to the second request, updating the layer strategy of the first client to provide access to the third layer of the overlay file system to the first client.

17. The computer-readable medium of claim 16, wherein:
the third artifact indicates a dependency on the first artifact; and
the updating of the layer strategy of the first client to provide access to the third layer of the overlay file system to the first client comprises, based on the dependency, providing the third layer as a higher layer than the first layer.

18. The computer-readable medium of claim 15, wherein the first artifact comprises a first plurality of files and the second artifact comprises a second plurality of files.

19. The computer-readable medium of claim 15, wherein the first client has read-only access to the first layer.

20. The computer-readable medium of claim 15, wherein:
the first client is of a first tenant comprising the first client and a second client; and
the updating of the layer strategy of the first client comprises updating a layer strategy of the first tenant.

\* \* \* \* \*